United States Patent [19]

Klobucar

[11] Patent Number: 4,912,191

[45] Date of Patent: Mar. 27, 1990

[54] SULFUR CURED POLYFLUOROALKOXYEUGENOXYPHOSPHAZENE COMPOSITION

[76] Inventor: W. Dirk Klobucar, 13835 Darilyn Dr., Baton Rouge, La. 70816

[21] Appl. No.: 270,831

[22] Filed: Nov. 14, 1988

Related U.S. Application Data

[62] Division of Ser. No. 72,296, Jul. 13, 1987, Pat. No. 4,849,494.

[51] Int. Cl.[4] .............................................. C08G 73/00
[52] U.S. Cl. .................................... 528/168; 524/610; 525/538; 528/167; 528/169; 528/399
[58] Field of Search ............... 528/168, 167, 169, 399; 525/538; 524/610

[56] References Cited

U.S. PATENT DOCUMENTS

| | | | |
|---|---|---|---|
| 3,888,799 | 6/1975 | Rose et al. | 260/2 P |
| 3,945,966 | 3/1976 | Vicic et al. | 260/42.15 |
| 3,970,533 | 7/1976 | Kyker et al. | 528/168 |
| 4,113,670 | 9/1978 | Dieck et al. | 521/95 |
| 4,849,494 | 7/1989 | Klobucar | 528/399 |

OTHER PUBLICATIONS

Reynard et al, Final Report, Army Materials and Mechanics Research Center, Contract No. DAAG46-7-3-C-0215, Mar. 1974.

*Primary Examiner*—Harold D. Anderson

[57] ABSTRACT

Polyfluoroalkoxyphosphazenes cured through eugenoxy groups result in elastomer compositions having higher modulus, tensile strength and elongation retention and lower compression set compared to a similar polyfluoroalkoxyphosphazene cured through conventional ortho-allylphenoxy groups.

10 Claims, No Drawings

SULFUR CURED POLYFLUOROALKOXYEUGENOXYPHOSPHAZENE COMPOSITION

This application is a division of application Ser. No. 072,296, filed July 13, 1987, now U.S. Pat. No. 4,849,494.

BACKGROUND

Polyorganophosphazenes comprise a linear or cyclic chain of

units in which the P atom is substituted with 2 organo groups which may be the same or different. Typical organo substituents are phenoxy, alkylphenoxy, halphenoxy, alkoxyphenoxy, alkoxy, polyalkoxy, haloalkoxy and the like. Typical polyaryloxyphosphazenes are disclosed in U.S. Pat. No. 3,853,794 and typical polyfluoroalkoxyphosphazenes are taught in U.S. Pat. No. 3,515,688. Mixed aryloxy-fluoroalkoxy substituted polyphosphazenes are disclosed in U.S. Pat. No. 3,700,629.

Linear and cyclic polyorganophosphazenes are soluble in solvents such as tetrahydrofuran (THF), cyclohexane, benzene and toluene but can be cured (i.e., cross-linked) to an insoluble elastomer. Rose et al. U.S. Pat. No. 3,888,799 disclose polyfluoroalkoxyphosphazenes containing unsaturated aliphatic groups such as allyloxy that can be cross-linked by peroxide curing agents. Vicic et al. U.S. Pat. No. 3,945,966 mentions that polyfluoroalkoxyphosphazenes containing iso-eugenol moieties (i.e., 2-methoxy-4-propenylphenoxide) may be peroxide cured. This appears to be based on the research described in Reynard et al. "Evaluation of Poly (Fluoroalkoxyphosphazene) Elastomers and Plastics," Final Report, Contract No. DAAG46-73-C-0215, AMMRC CTR 74-18.

Kyker et al. U.S. Pat. No. 3,970,533 disclose polyfluoroalkoxyphosphazenes having some alkenylphenoxy substituents, especially ortho-allylphenoxy, which can be cured by peroxides, radiation or conventional sulfur vulcanization. Dieck et al. U.S. Pat. No. 4,113,670 disclose polyaryloxyphosphazenes which have alkenylaryloxy groups (e.g., ortho-allyphenoxy, eugenoxy, etc.) which can be cured by peroxides or sulfur.

Cheng U.S. Pat. No. 4,116,785 discloses certain nonfluorinated alkoxy and/or aryloxy-substituted polyphosphazenes which also contain olefinic substituents such as ortho-allylphenoxy groups which can be cured by conventional sulfur vulcanization or by radiation.

SUMMARY OF THE INVENTION

It has now been discovered that cured polyfluoroalkoxyphosphazene elastomers made from eugenoxy-substituted cyclic or linear polyfluoroalkoxyphosphazenes possess superior physical properties compared to conventional cured elastomers made from ortho-allylphenoxy substituted polyfluoroalkoxyphosphazenes.

DESCRIPTION OF THE PREFERRED EMBODIMENTS

A preferred embodiment of the invention is a cyclic or linear organo phosphazene polymer containing the units:

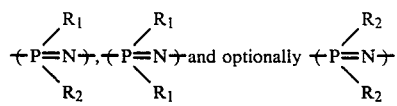

wherein $R_1$ is a fluoroalkoxy group having the structure $$XF_2C-(CF_2)_n-CH_2O-$$

wherein n is 0 or an integer from 1 to 20, X is hydrogen or halogen and $R_2$ is the eugenoxide group, the total number of units ranging from 3 to about 100,000 and the eugenoxide groups being present in an amount sufficient to enable cure of the phosphazene polymer and in the range of about 0.01 to 50 mole percent of the total number of $R_1$ and $R_2$ groups. The unit with 2 $R_2$ groups is said to be optional because at low eugenoxy levels in high polymers, little if any of the

units will carry 2 eugenoxy substituents.

The uncured polyphosphazene may be cyclic or substantially linear. Cyclic phosphazenes contain 3 to about 7

units in a ring. The most abundant components are trimer and tetramer, especially trimer.

Substantially linear phosphazenes are identified by their solubility in solvents such as THF, toluene, benzene, cyclohexane and the like. Minor amounts of cross-linking that does not render the polymer insoluble in such solvents is considered substantially linear. The number of

units in the linear poolyphosphazene can be from about 3 up to 100,000 or more and the preferred range is about 20–75,000 and a more preferred range is about 100–50,000.

Each phosphorus atom in the

chain of both the cyclic and linear polyphosphazene is substituted with two organo groups. One type of substituent, designated $R_1$, are fluoroalkoxy groups. This class includes any alkoxy groups having fluorine substituents. The preferred fluoroalkoxy groups have the structure $$XF_2C-(CF_2)_n-CH_2O- \qquad (I)$$

wherein X is hydrogen or halogen and n is 0 or an integer from 1 to 20. More preferably X is hydrogen and n is 0 or an integer from 1 to 13. Still more preferably n will have a value of 0–9. The value of n need not be the same on each fluoroalkoxy substituent because mixtures of fluoroalkoxy groups are included in the scope of the invention.

In a highly preferred case, about 5–95 mole percent of the fluoroalkoxy groups are 2,2,2-trifluoroethoxy groups and the remaining 95–5 mole percent of the fluoroalkoxy groups are a mixture of fluoroalkoxy groups having the structure $$XF_2C-(CF_2)_m-CH_2O- \qquad (II)$$

wherein X is hydrogen or fluorine and m is an integer from 1 to 20.

In a still more preferred case, 55–75 mole percent of the fluoroalkoxy groups are trifluoroethoxy groups and the remaining fluoroalkoxy groups have the above structure II in which m is in the range of 1 to 13.

An essential feature of the invention is the presence of eugenoxy groups bonded to the backbone phosphorus atom. Eugenoxy groups have the structure

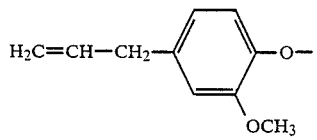

and can also be named 2-methoxy-4-allylphenoxy. The number of such groups per molecule should be at least 2 and preferably an amount that gives the desired degree of cure (i.e., cross-linking) on treatment with a curing agent such as a peroxide or sulfur. In the low molecular weight cyclic polyorganophosphazenes which do not have many phosphorus atoms the mole percent of eugenoxy substituents based upon the total substituents can be quite high. For example, organophosphazene trimer has only 6 substituents on phosphorus so if only two are eugenoxy, this represents 33 mole percent of the total phoshporus substituents. If 3 are eugenoxy, then 50 mole percent of the substituents are eugenoxy. In the case of the high molecular weight linear polyphosphazenes, the number of phosphorus atoms in the backbone is much higher so that the mole percent eugenoxy groups need not be as high in order to provide the desired degree of cure. A useful range of eugenoxy substituents is about 0.1 to 50 mole percent. With cyclics the preferred range is an amount sufficient to provide an average of at least 2 eugenoxy groups per cyclic molecule up to about 50 mole percent. With linears, the preferred range is about 0.01–20 mole percent and more preferably about 0.05–15 mole percent and most preferably about 0.1–5 mole percent.

The polyorganophosphazenes are readily made by first reacting ammonium chloride with phosphorus pentachloride in monochlorobenzene solvent at 120°–130° C. to form a mixture of cyclic and low molecular weight linear phosphonitrilic chlorides. These can be recovered by removing the solvent and the mixture used in the following substitution reaction or the cyclics can be separated by crystallization or distillation or both and used in the substitution reaction.

High molecular weight linear polyphosphonitrilic chlorides can be made by purifying the cyclics and then heating them under an inert atmosphere at about 220°–270° C. for 24 hours or more until the desired degree of polymerization has occurred. A small amount of a catalyst such as boron trichloride can be added to promote the polymerization. The polymerization mixture can then be dissolved in a solvent such as benzene, toluene or cyclohexane and this solution added to a non-solvent such as heptane which will cause the linear polyphosphonitrilic chlorides to precipitate.

The phosphonitrilic chloride, either cyclic or linear, can then be substituted with the desired organo substituents by dissolving it in a solvent such as THF or cyclohexane and adding the solution to a solution of the sodium salt of eugenol and/or fluoroalcohol in THF in any order. Preferably the solution of phosphonitrilic chloride is first reacted with the solution of sodium eugenoxide to introduce the desired amount of eugenoxy substituents and this mixture is then reacted with a THF solution of sodium fluoroalkoxide to complete the substitution. The resultant solution can then be centrifuged to remove salt and then added to stirred non-solvent to coagulate the polymer. It may be necessary to re-dissolve the polymer in a solvent such as THF or acetone several times and to precipitate the gum by adding the solution to water to remove any remaining salt.

The eugenoxy substituted polyfluoroalkoxy phosphazene is generally compounded with other conventional ingredients prior to curing. These include fillers (e.g., alumina trihydrate, magnesia, silica, carbon black, and the like), processing aids (e.g., stearic acid, zinc oxide, zinc stearate and the like), plasticizers (e.g., organophosphazene oil, naphthenic oil and the like), pigments, stabilizers, antioxidants and the like. If the polymer is to be made into a foam, a blowing agent can be added such as azobisisobutyronitrile.

A curing agent is blended into the compound. Peroxide or other free-radical generating agents work quite well. Examples of these are benzoylperoxide, 2,5-dimethyl-2,5-di(tert-butylperoxy)hexane, bis(4-chlorobenzoyl)peroxide; 1,1-bis(t-butylperoxy)-3,5,5-trimethylcyclohexane, tert-butyl perbenzoate, dicumyl peroxide; α,α'-bis(t-butylperoxy)diisopropylbenzene and the like. They are used at concentrations of about 0.1–10 parts per 100 (pph) of polyorganophosphazene. Alternatively, sulphur vulcanizing system may be used. Such systems are well known. Typical phosphazene vulcanizing systems are described in Cheng U.S. Pat. No. 4,116,785. They include about 0.25–5 pph of sulphurbased on the polymer content of the compound together with accelerators such as zinc dimethyldithiocarbamate and/or mercaptobenzothiazole.

Phosphazenes can also be cured by chemical agents having at least 2 reactive sites. For example, polyhydrosiloxanes in the presence of a platinum catalyst will cross-link polyorganophosphazenes through a siloxane bridge.

The following examples show the preparation of eugenoxy-substituted polyfluoroalkoxyphosphazenes of the present invention.

EXAMPLE 1

In a glass reaction vessel was placed 613.1 grams of a solution of high molecular weight linear polyphosphonitrilic chloride (99.7 grams, 1720 meq chloride) in cyclohexane. To the stirred solution was added 12.5 grams of a solution of sodium eugenoxide (2.88 grams, 15.5 meq) in THF plus an additional 177 grams of dry THF. The mixture was stirred at room temperature for 45 minutes. Then 1466 grams of a second THF solution of sodium fluoroalkoxide (1861 meq) as 1210 meq (147.6 grams) of sodium trifluoroethoxide and 651 me1 (167.4 grams) of sodium polyfluoroalkoxide of structure II in which X is hydrogen and m has a value of 1–13 averaging about 5 plus an additional 833 grams of dry THF was placed in a different glass reaction flask. The first solution was then added to the second solution over a 15 minute period at 23°–59° C. while stirring. The mixture was then stirred at 60° C. for one hour and at 65° C. for 5 hours.

The reaction mixture was then acidified with 5.5 grams conc. sulfuric acid. Salts were agglomerated by adding 80.9 grams of saturated sodium bromide solution. The reaction mixture was centrifuged to remove salt and the clarified polyorganophosphazene gum solution was slowly added to 16 liters of hexane while stirring to precipitate the gum. The gum was collected and redissolved in 3 liters of acetone. This solution was centrifuged to remove salt and the gum again precipitated by adding the acetone solution to 12 liters of deionized water. The gum was again dissolved in 3 liters of acetone and this solution centrifuged and then added slowly to 12 liters of water. The light beige gum that precipitated was collected and air dryed overnight and then under vacuum (0.2 torr) at 66° C. to a constant weight (215 grams).

Total Chloride: 22 ppm
Intrinsic Visc. (Acetone, 25° C.): 1.9 dl/g
Glass Transition Temp. (Tg): −69° C.

EXAMPLE 2

610.8 grams of a cyclohexane solution of high molecular weight linear polyphosphonitrilic chloride (99.3 grams polymer, 1714 meq chloride) was placed in a stirred reaction flask. Then, 8.23 grams of a THF solution of sodium eugenoxide (10.3 meq) plus 179 grams of dry THF was added. The mixture was stirred 45 minutes at room temperature. Then, 1460 grams (1825 meq) of the same THF solution of mixed sodium fluoroalkoxides used in Example 1 was placed in another reaction flask. The phosphonitrilic chloride-eugenoxide solution was added to the fluoroalkoxide solution over 12.5 minutes while stirring at 25°–63° C. Stirring was continued 6 hours at 60° C. The resulting eugenoxy-substituted polyfluoroalkoxyphosphazene was recovered in the same manner as in Example 1.

Eugenoxy Content: 0.46 wt percent
Total Chloride: 44 ppm
Intrinsic Viscosity: (Acetone, 25° C.): 2.0 dl/g
Tg: −70° C.

EXAMPLE 3

In a reaction flask was placed 21.6 grams of a THF solution of sodium eugenoxide (27.2 meq), 170 grams of dry THF and 1335.4 grams of a THF solution of sodium fluoroalkoxides (1683 meq) as used in Example 1. An additional 856 grams of dry THF was also added. In an addition funnel was placed 768.4 grams of a cyclohexane solution of high molecular weight linear polyphosphonitrilic chloride (90.5 grams polymer, 1562 meq chloride). This was added to the sodium fluoroalkoxide-eugenoxide solution at 25°–40° C. over a 114 minute period. The mixture was then stirred 4 hours at 60° C. The mixture then stood overnight. The mixture was acidified with 6.9 grams of conc. sulfuric acid and the gum recovered as in Example 1. The following gum analysis was obtained.

Eugenoxy Content: 0.24 weight percent
Total Chloride: 0.013 weight percent
Intrinsic Viscosity (Acetone, 25° C.): 1.9 dl/gram

EXAMPLE 4

In a first reaction vessel was placed 765.6 grams of a cyclohexane solution of high molecular weight linear polyphosphonitrilic chloride as used in Example 1 (1548 meq chloride). In a second larger reaction vessel was placed 1163 grams of THF solution of sodium fluoroalkoxides (1674 meq) as used in Example 1 plus an additional 855 grams of dry THF. To the first vessel was added 6.15 grams of THF solution of sodium eugenoxide (7.75 meq) and 103 grams of dry THF while stirring. The first solution was stirred 12 minutes at room temperature and then added to the second larger vessel over a 20 minute period at 25°–56° C. The mixture was stirred 6 hours at 60° C. and then stood overnight. The mixture was acidified with 6.7 grams of conc. sulfuric acid. The gum was recovered as described previously and analyzed as follows:

Eugenoxide Content: 0.32 weight percent
Total Chloride: 0.014 weight percent
Intrinsic Viscosity (Acetone, 25° C.): 2.0 dl/gram

EXAMPLE 5

In a first reaction flask was placed 619.7 grams of a cyclohexane solution of high molecular weight linear polyphosphonitrilic chloride (1739 meq chloride). While stirring, a mixture of 4.2 grams of a THF solution of sodium eugenoxide (5.3 meq) and 171 grams of dry THF was added. This was stirred 45 minutes at room temperature. In a second reaction flask was placed 1479 grams of a THF solution of sodium fluoroalkoxides (1878 meq) as described in Example 1 followed by 822 grams of dry THF. The solution in the first flask was added to the solution in the second flask over a 10.5 minute period at 24°–62° C. The resulting mixture was stirred 6 hours at 60° C. Following this the polyorganophosphazene gum was recovered as in Example 1. The gum analyzed as follows:

Total Chloride: 62 ppm
Intrinsic Viscosity (Acetone, 25° C.): 1.9 dl/g
Tg: −70° C.
Eugenoxy Content: 0.21 weight percent It has been found that the polyfluroalkoxyphosphazene having eugenoxy cross-linking groups has improved physical properties compared to conventional polyfluoroalkoxyphosphazene having ortho-allyl-phenoxy cross-linking groups. In particular, it was found that the 50 percent modulus, tensile strength, compression set and retention of elongation were substantially improved.

Tensile properties were obtained following ASTM D 412-83, Method B (Standard Test Methods for Rubber Properties in Tension). The term "modulus" is used following common usage to refer to tensile stress at a given relative elongation. English units (psi) have been used.

In the same tensile strength test, elongatin at breaking point was also measured both before and after heat aging of the test specimens. Elongation properties are reported as the percent retention of initial elongation. Higher values are preferred.

Compression set measurements were obtained following ASTM D 395-78 (Standard Test Methods for Rubber Property-Compression Set) using Method B (constant deflection). A molded Type 1 specimen (0.5" thick) was used and compressed 25% under the conditions noted. Smaller compression set values indicate less retention to the test compression conditions and are improvements.

Higher moduli values are preferred in many applications particularly in seals and gaskets. Higher tensile strengths are always preferred.

The tests were conducted on both eugenoxy and orthoallyphenoxy substituted polyfluorophosphazene in identical formulations. The only difference between the specimens was the cross-linking group. The following formulation was used.

|  | Weight Percent |
| --- | --- |
| Gum | 72.0 |
| Surface Treated Silica | 21.6 |
| Magnesium Oxide | 4.3 |
| Stabilizer | 1.4 |
| α, α'-bis(tert-butylperoxy)-diisopropylbenzene (40% active[1]) | 0.6 |

[1] Vul-Cup ® 40 KE, Hercules Inc.

The formulated gum was then cured for 30 minutes (50 minutes for compression set buttons) at 171° C. and then post-cured 4 hours at 177° C. Fifty percent modulus and tensile strength were measured initially and after aging at specified times and temperatures. Compression set was measured after compressing the test specimen for a specified time at a specified temperature. The following Table 1 gives the cross-linking agent and concentration used in six different specimens and gives the tensile strength, 50 percent modulus and compression set for each.

TABLE 1

| Cross-Linking Agent (wt %) | Specimen | | | | |
| --- | --- | --- | --- | --- | --- |
|  | 1 | 2 | 3 | 4 | 5 |
| EGO[1] | 0.3[5] | 0.6[3] | 0.9[4] |  |  |
| OAP[2] |  |  |  | 0.38 | 0.43 |
| Tensile Strengths (psi) | | | | | |
| Initial | 1518 | 1418 | 1046 | 1773 | 1724 |
| Hours at 200° C. | | | | | |
| 70 | 1441 | 1223 | 938 | 1305 | 1275 |
| 120 | 1242 | 1065 | 926 | 1093 | 1000 |
| 50% Modulus (psi) | | | | | |
| Initial | 296 | 463 | 451 | 302 | 281 |
| Hours at 200° C. | | | | | |
| 70 | 335 | 549 | 578 | 305 | 282 |
| 120 | 327 | 511 | 537 | 251 | 254 |
| Compression Set (%) | | | | | |
| After 70 hrs at 149° C. | 18 | 16 | 17 | 22 | 23 |

[1] Eugenoxide
[2] Ortho-Allylphenoxide
[3] Gum from Example 2
[4] Gum from Example 1
[5] Gum from Example 5

In the above test the initial tensile strength of the OAP cross-linked elastomer was very good but deteriorated somewhat on aging at 200° C. The EGO cross-linked elastomer had good initial tensile and showed but little degradation on extended heat aging.

The 50% modulus of the EGO cross-linked polyfluoroalkoxyphosphazene was substantially higher than the OAP cross-linked polymer. In addition, the EGO cross-linked elastomer did not suffer a drop in a modulus on heat aging but in fact showed further improvement.

Compression set is an especially important property for elastomers used in gaskets and seals. The EGO cross-linked elastomer showed a distinct advantage over the OAP cross-linked elastomer making it especially useful in the fabrication of seals such as gaskets and o-rings.

Three more identical formulations were prepared except that the first two were made with OAP cross-linked gum and the third with EGO cross-linked gum. The formulations contained 212.3 grams of gum, 115.6 grams inorganic filler, 4.3 grams green pigment, 4.2 grams stabilizers and 12.7 grams of processing aid. After blending, a 55 gram sample of each formulation was removed for other purposes. Then 0.8 grams of a peroxide curing agent α,α''-bis(tert-butylperoxy)diisopropylbenzene 40% active was blended into each batch and each batch was molded into test specimens and cured at 171° C. for 30 minutes. Then, 50 percent modulus, tensile strength and compression set was measured on each. The specimens used for the compression set test were cured at 171° C. for 50 minutes. All specimens were then post-cured 4 hours in an oven at 177° C. The following Table gives the test results.

TABLE 2

| Cross-Linking Agent (wt %) | Specimen | | |
| --- | --- | --- | --- |
|  | 1[1] | 2[2] | 3[3] |
| OAP | 0.43 | 0.38 |  |
| EGO |  |  | 0.26 |
| Tensile Strength (psi) | | | |
| Initial | 1736 | 1735 | 2047 |
| Hours at 175° C. | | | |
| 70 | 1776 | 1741 | 1947 |
| 168 | 1358 | 1465 | 1699 |
| 500 | 783 | 903 | 1452 |
| Hours at 200° C. | | | |
| 70 | 1069 | 1172 | 1633 |
| 168 | 628 | 737 | 1371 |
| 500 | 347 | 367 | 719 |
| Hours at 225° C. | | | |
| 8 | 1116 | 1186 | 1508 |
| 22 | 517 | 617 | 1113 |
| 70 | 379 | 387 | 767 |
| 50% Modulus (psi) | | | |
| Initial | 940 | 941 | 1040 |
| Hours at 175° C. | | | |
| 70 | 920 | 900 | 1015 |
| 168 | 906 | 861 | 1077 |
| 500 | 675 | 696 | 986 |
| Hours at 200° C. | | | |
| 70 | 784 | 765 | 966 |
| 168 | 608 | 620 | 911 |
| Hours at 225° C. | | | |
| 8 | 736 | 718 | 920 |
| 22 | 490 | 534 | 785 |
| 70 |  |  | 638 |
| Compression Set (%) | | | |
| After 22 hrs @ 149° C. | 28 | 26 | 21 |
| After 70 hrs @ 149° C. | 40 | 38 | 28 |
| After 22 hrs @ 177° C. | 50 | 50 | 35 |
| Elongation (% Retention) | | | |
| Hours at 175° C. | | | |
| 70 | 100.0 | 101.1 | 94.6 |

TABLE 2-continued

| | | | |
|---|---|---|---|
| 168 | 85.9 | 98.9 | 82.8 |
| 500 | 75.0 | 85.3 | 80.6 |
| Hours at 200° C. | | | |
| 70 | 83.7 | 94.7 | 89.2 |
| 168 | 59.9 | 80.0 | 87.1 |
| 500 | 26.1 | 30.5 | 68.8 |
| Hours at 225° C. | | | |
| 70 | 34.8 | 40.0 | 77.4 |
| 168 | — | — | — |
| 500 | — | — | — |

[1]Commercial OAP gum
[2]Lab prepared OAP gum
[3]The EGO gum was a composite of 8 separate preparations which were combined by dissolving in acetone and precipitating in deionized water (eugenoxide 0.26 wt %, IV 2.0 dl/g, Tg-65° C.)

These results show that the initial tensile strength of the EGO is over 300 psi higher than the OAP cross-linked elastomer and exhibited a much higher value even after heat aging at 175°, 200° and 225° C.

The 50 percent modulus of the new EGO cross-linked polyfluoroalkoxyphosphazene was 100 psi higher initially and showed little degradation during heat aging at 175° C. At 200° and 225° C., some drop in modulus was observed but much less than with the OAP cross-linked elastomer.

Compression set at 149° of the EGO elastomer was significantly lower than with the OAP elastomer after both 22 and 70 hours of compression. After 22 hours of compression at 177° C. the OAP elastomer retained 50% of its deformation whereas the EGO elastomer retained only 35% of its deformation.

Retention of elongation at breaking point was exceptionally good for the EGO elastomer in the 225° C. test. Even in the 200° C. test the elongation of the EGO elastomer was markedly superior after 168 and 500 hours.

Three more identical formulations were blended except for the polyfluoroalkoxyphosphazene gum. The gum differed in the cross-linking substituent. Each batch contained 180 grams of gum, 77 grams of inorganic filler, 7.2 grams stabilizer, 0.8 grams silane modifier, 18 grams processing aid and 1.44 grams peroxide curing agent (Vul Cup ®40 KE). The blended batches were molded as test specimens and cured at 171° C. for 30 minutes (50 minutes for compression set buttons) and post-cured 4 hours at 177° C. The following table shows the test results obtained.

TABLE 3

| Cross-Linking | Specimen | | |
|---|---|---|---|
| Agent (wt. %) | 1[1] | 2[2] | 3[3] |
| OAP | 0.43 | 0.38 | |
| EGO | — | — | 0.26 |
| 50% Modulus (psi) | | | |
| Initial | 376 | 355 | 470 |
| Hours at 175° C. | | | |
| 70 | 354 | 319 | 498 |
| 168 | 351 | 326 | 515 |
| 500 | 362 | 348 | 536 |
| Hours at 200° C. | | | |
| 70 | 312 | 303 | 479 |
| 168 | 307 | 314 | 501 |
| 500 | 200 | 214 | 439 |
| Hours at 225° C. | | | |
| 22 | 243 | 240 | 403 |
| 70 | 243 | 189 | 333 |
| 168 | | | 251 |
| Tensile Strength (psi) | | | |
| Initial | 1564 | 1566 | 1640 |
| Hours at 175° C. | | | |
| 70 | 1373 | 1400 | 1546 |
| 168 | 1234 | 1257 | 1509 |
| 500 | 895 | 1008 | 1336 |
| Hours at 200° C. | | | |
| 70 | 1011 | 1082 | 1406 |
| 168 | 644 | 759 | 1198 |
| 500 | 211 | 252 | 777 |
| Hours at 225° C. | | | |
| 22 | 544 | 599 | 1104 |
| 70 | 206 | 223 | 620 |
| 168 | 151 | 158 | 283 |
| Compression Set (%) | | | |
| After 22 hrs @ 149° C. | 19 | 21 | 12 |
| After 70 hrs @ 149° C. | 27 | 29 | 20 |
| After 22 hrs @ 177° C. | 48 | 47 | 33 |
| After 70 hrs @ 177° C. | 47 | 53 | 37 |
| Elongation (% Retention) | | | |
| Hours at 175° C. | | | |
| 70 | — | 96.7 | 97.6 |
| 168 | 97.4 | 98.8 | 96.0 |
| 500 | 81.9 | 87.7 | 91.1 |
| Hours at 200° C. | | | |
| 70 | 99.4 | 99.4 | 96.8 |
| 168 | 84.5 | 86.5 | 91.1 |
| 500 | 63.2 | 69.6 | 85.5 |
| Hours at 225° C. | | | |
| 70 | 72.3 | 78.4 | 102.4 |
| 168 | 27.1 | 25.1 | 83.9 |
| 500 | — | — | — |

[1]Commercial OAP gum
[2]Lab prepared OAP gum
[3]See Table 2 footnote 3.

Here the superiority of the EGO elastomer in 50 percent modulus, tensile strength, compression and elongation set is again clearly evident.

Further tests were conducted to determine the compatability of the above EGO elastomer with diesel fuel. Modulus and tensile were measured after aging while submerged in No. 2 diesel fuel at the indicated temperature. The results are given in the following Table 4.

TABLE 4

| Cross-Linking | Specimen | | |
|---|---|---|---|
| Agent (wt %) | 1 | 2 | 3 |
| OAP | 0.43 | 0.38 | — |
| EGO | — | — | 0.26 |
| 50% Modulus (psi) | | | |
| Initial | 376 | 355 | 470 |
| Hours at 121° C. | | | |
| 70 | 241 | 227 | 334 |
| 168 | 238 | 233 | 320 |
| Tensile Strength (psi) | | | |
| Initial | 1564 | 1566 | 1640 |
| Hours at 121° C. | | | |
| 70 | 1402 | 1365 | 1392 |
| 168 | 1327 | 1256 | 1362 |

These results show that the diesel fuel does appear to accelerate degradation but that the EGO cross-linked elastomer is still superior to the OAP cross-linked elastomer.

I claim:

1. A sulfur-cured phosphazene elastomer of a cyclic or linear organophosphazene polymer containing the units

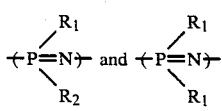

-continued
or

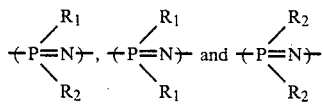

wherein $R_1$ is a fluoroalkoxy group having the structure $$XF_2C-(CF_2)_n-CH_2O-$$

wherein n is 0 or an integer from 1 to 20 and X is hydrogen or halogen and $R_2$ is the eugenoxide group, the total number of said units ranging from 3 to about 100,000 and the eugenoxide groups being present in an amount sufficient to enable the sulfur cure of said polymer and in the range of about 0.01-50 mole percent of the total number of $R_1$ and $R_2$ groups.

2. A sulfur-cured phosphazene elastomer of a cyclic or linear organophosphazene polymers containing the units

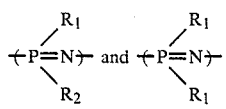

or

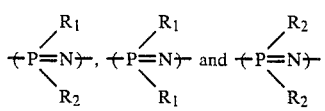

wherein $R_1$ is a fluoroalkoxy group having the structure $$XF_2-(CH_2)_n-CH_2O-$$

wherein n is 0 or an integer from 1 to 20 and X is hydrogen or halogen and $R_2$ is the eugenoxide group, the total number of said units ranging from 3 to about 100,000 and the eugenoxide groups being present in an amount sufficient to enable the sulfur cure of said polymer and in the range of about 0.01-50 mole percent of the total number of $R_1$ and $R_2$ groups.

3. A phosphazene elastomer of claim 2 wherein $R_1$ is 2,2,2-trifluoroethoxy and the group $XF_2C-(CF_2)_m-CH_2O-$ wherein m is the integer 1 to 10 and X is hydrogen or fluorine, the mole percent of said 2,2,2-trifluoroethoxy to said group $XF_2C-(CF_2)_m-CH_2O-$ being from 95:5 to 5:95.

4. A phosphazene elastomer of claim 3 containing 1 or more fillers, processing aids, stabilizers, antioxidants or pigments.

5. A sulfur-cured phosphazene elastomer of a cyclic or linear organophosphazene polymers containing the units

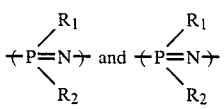

or

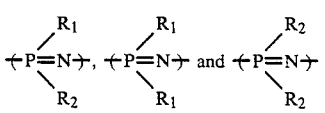

wherein $R_1$ is a fluoroalkoxy group having the structure $$XF_2-(CF_2)_n-CH_2O-$$

wherein n is 0 or an integer from 1 to 20 and X is fluorine and $R_2$ is the eugenoxide group, the total number of said units ranging from about 100-50,000 and the eugenoxide groups being present in an amount sufficient to enable the sulfur cure of said polymer and in the range of about 0.01-20 mole percent of the total number of $R_1$ and $R_2$ groups.

6. A phosphazene elastomer of claim 5 containing 1 or more fillers, processing aids, antioxidants, stabilizers or pigments.

7. A peroxide cured phosphazene elastomer of a cyclic or linear organophosphazene polymers containing the units

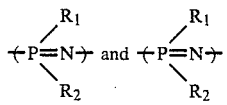

or

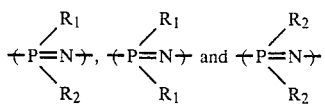

wherein $R_1$ is a fluoroalkoxy group having the structure $$XF_2-(CF_2)_n-CH_2O-$$

wherein n is 0 or an integer from 1 to 20 and X is hydrogen or halogen and $R_2$ is the eugenoxide group, the total number of said units ranging from 3 to about 100,000 and the eugenoxide groups being present in an amount sufficient to enable the peroxide cure of said polymer and in the range of about 0.01-50 mole percent of the total number of $R_1$ to $R_2$ groups.

8. A phosphazene elastomer of claim 7 containing 1 or more conventional fillers, processing aids, stabilizers, antioxidants or pigments.

9. A peroxide cured phosphazene elastomer of a cyclic or linear organophosphazene polymers containing the units

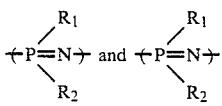

or

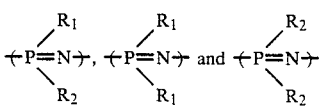

wherein $R_1$ is a fluoroalkoxy group having the structure $$XF_2-(CF_2)_n-CH_2O-$$

wherein n is 0 or an integer from 1 to 20 and X if fluorine and $R_2$ is the eugenoxide group, the total number of said units ranging from about 100-50,000 and the eugenoxide groups being present in an amount sufficient to enable the sulfur cure of said polymer and in the range of about 0.01-20 mole percent of the total number of $R_1$ and $R_2$ groups.

10. A phosphazene elastomer of claim 9 containing processing aids, stabilizers, antioxidants or pigments.

* * * * *

UNITED STATES PATENT AND TRADEMARK OFFICE
CERTIFICATE OF CORRECTION

PATENT NO. : 4,912,191
DATED : March 27, 1990
INVENTOR(S) : W. Dirk Klobucar

It is certified that error appears in the above-identified patent and that said Letters Patent is hereby corrected as shown below:

On the title page, add --[73] Assignee: Ethyl Corporation, Richmond, Va.--

On the title page, add --Attorney, Agent or Firm—Joseph D. Odenweller--.

Column 11, line 25, second R, reads "$R_1$" and should read -- $R_2$ --.

Column 11, line 35, reads "$XF_2-(CH_2)n-CH_2O$" and should read -- $XF_2-(CF_2)n-CH_2O$ --.

Signed and Sealed this

Sixteenth Day of June, 1992

*Attest:*

DOUGLAS B. COMER

*Attesting Officer*  *Acting Commissioner of Patents and Trademarks*